(12) United States Patent
Dubin et al.

(10) Patent No.: US 6,524,485 B1
(45) Date of Patent: Feb. 25, 2003

(54) POLYMER-MICELLE COMPLEXES AND METHODS OF USE THEREOF

(75) Inventors: Paul L. Dubin, Indianapolis, IN (US); Gabriel Filippelli, Indianapolis, IN (US); Jeffrey Banziger, Fairbanks, AK (US)

(73) Assignee: Advanced Research and Technology Institute, Inc., Indianapolis, IN (US)

( * ) Notice: Subject to any disclaimer, the term of this patent is extended or adjusted under 35 U.S.C. 154(b) by 259 days.

(21) Appl. No.: 09/662,913

(22) Filed: Sep. 15, 2000

Related U.S. Application Data
(60) Provisional application No. 60/154,562, filed on Sep. 17, 1999.

(51) Int. Cl.$^7$ .................................................. C02F 1/28
(52) U.S. Cl. .................... 210/690; 210/500.1; 210/747; 252/175; 405/128.5; 405/128.75
(58) Field of Search ............................. 210/500.1, 690, 210/747; 252/175; 405/128.5, 128.75

(56) References Cited

PUBLICATIONS

Barna et al., "Leaching Behavior of Pollutants in Stabilized/Solidified Wastes," *J. Hazard. Mater.*, 52 (2–3), 287–310 (1997).
Chen et al., "Feasibility Study of In Situ Bioremediation for PAH–Contaminated Soil," *Proc. Annu. Meet.—Air Waste Manage. Assoc.*, 13, 2–9 (1994).
Edwards et al., "Surfactant Solubilization of Organic Compounds in Soil/Aqueous Systems," *J. Environ. Eng.*, 120 (1), 5–22 (1994).
Ganeshalingam et al., "Surfactant–Enhanced Leaching of Polyaromatic Hydrocarbons from Soil," *Process Saf. Environ. Prot.*, 72 (B4), 247–251 (1994).
Hinze, "Cloud Point Extraction and Preconcentration Procedure for Organic and Related Pollutants of State Concern," *Water Resour. Res. Inst. Univ. N.C.*, Report No. 269, 36 pp. (1992).
Markels et al., "Design of Micellar–Enhanced Ultrafilters," *Ind. Eng. Chem. Res.*, 34 (7), 2436–2440 (1995).
Moroi et al., "Solubilization of Benzene, Naphthalene, Anthracene, and Pyrene in 1–Dodecanesulfonic Acid Micelle," *J. Phys. Chem.*, 99, 2372–2376 (1995).
Pestke et al., "Mobilization Potential of Hydrophobic Organic Compounds (HOCs) in Contaminated Soils and Waste Materials. Part I: Mobilization Potential of PCBs, PAHs, and Aliphatic Hydrocarbons in the Presence of Solubilizing Substances," *Acta Hydrochim. Hydrobiol.*, 25 (5), 242–247 (1997).
Sun et al., "Sorption of Nonionic Organic Compounds in Soil–Water Systems Containing a Micelle–Forming Surfactant" *Environ. Sci. & Technol.*, 29, 903–913 (1995).

*Primary Examiner*—Betsey Morrison Hoey
(74) *Attorney, Agent, or Firm*—Leydig Voit & Mayer, Ltd.

(57) ABSTRACT

A polymer-micelle complex is disclosed. The polymer-micelle complex includes a micelle having a negative charge. The negatively charged micelle is bound electrostatically to a polymer bearing a positive charge. The complex can be in turn electrostatically bound to a siliceous material so that the complex is immobilized on the siliceous material. In addition, a composition comprising a negatively charged micelle, a positively charged polymer, and an aqueous carrier is disclosed. The aqueous carrier can exhibit salinity. In the composition, the micelle and polymer can electrostatically interact so as to form a polymer-micelle complex (which can either be soluble in the aqueous carrier or in the form of a precipitate or coacervate), or, alternatively, the polymer and micelle can remain separate such that a complex is not formed therebetween. Also disclosed are certain products and methods pertaining to the aforesaid complex and/or composition, such as a filter, a method of treating fluids, a method of trapping organic contaminants, and a method of inhibiting seepage of organic contaminants.

41 Claims, 10 Drawing Sheets

Figure 11. Calibration curve for solution D at 276 nm. Table 2 contains the relevant data.

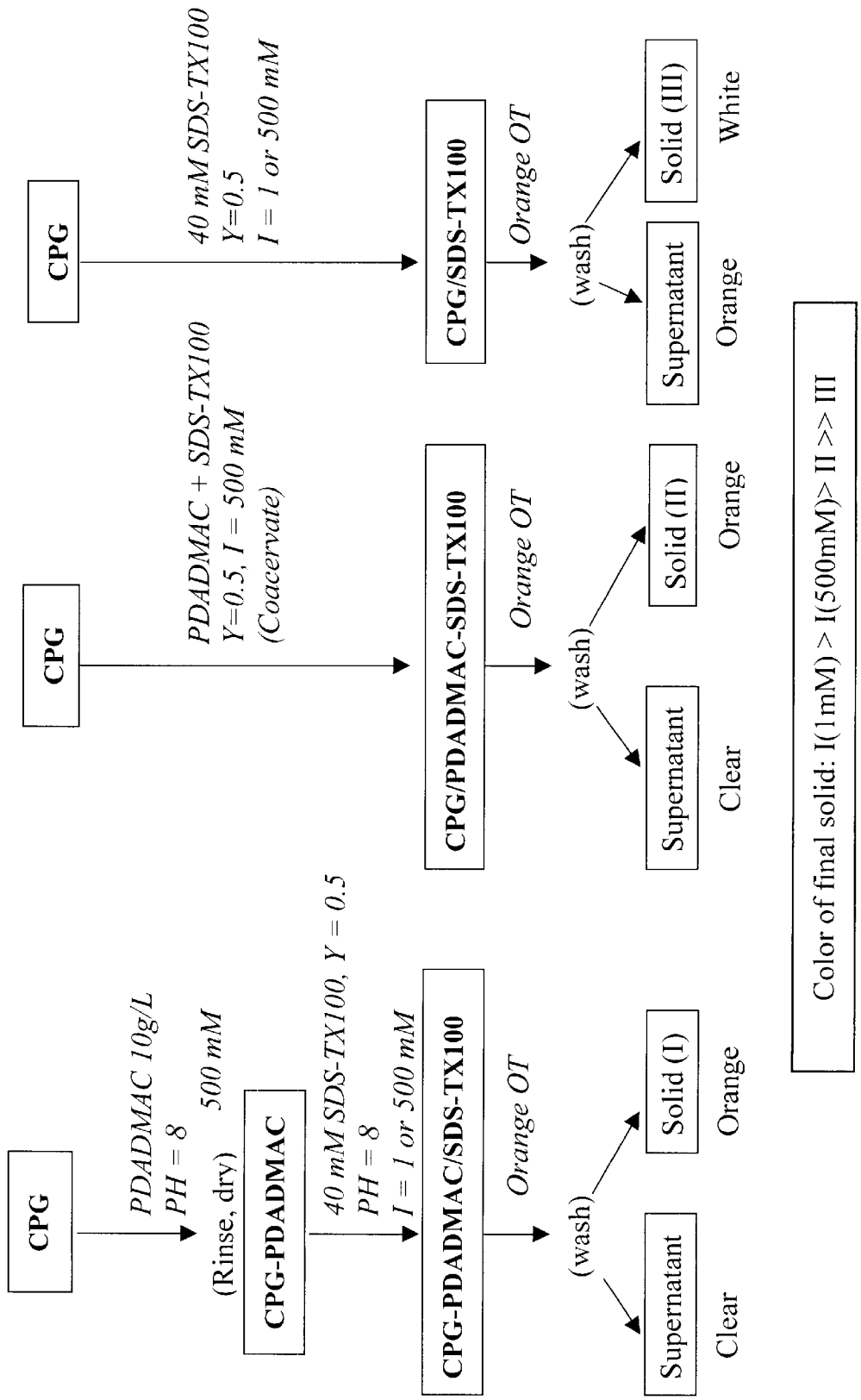
FIG. 10 Preparation and Evaluation of Polycation-Micelle Treated CPG

POLYMER-MICELLE COMPLEXES AND METHODS OF USE THEREOF

CROSS-REFERENCE TO RELATED PATENT APPLICATIONS

This patent application claims the benefit of U.S. provisional application No. 60/154,562, filed Sep. 17, 1999, which is incorporated by reference.

TECHNICAL FIELD OF THE INVENTION

The present invention pertains generally to micelles. In particular, the present invention relates to polymer-micelle complexes, as might be particularly useful in immobilizing contaminants.

BACKGROUND OF THE INVENTION

Environmental contamination by organic compounds is one of the most ubiquitous and costly environmental concerns facing society today. Such contamination can be caused by leakage or spillage of various non-aqueous phase liquids, which generally are very limited in their ability to dissolve in water. The non-aqueous phase liquids can contaminate the environment from a variety of sources, such as, for example, spillage or leakage of large-volume solvents used and stored in chemical and other manufacturing production facilities. Strictly by way of example, acetone, benzene, toluene, xylene, and the like can be released to the environment from such facilities.

Contamination can also result from leakage of underground storage tanks, such as, for example, gasoline tanks at service stations. Although some newer storage tanks are equipped with a liner (e.g., a clay liner such as bentonite), such tanks nevertheless are susceptible to leakage, especially in cases where the fluids being held are caustic in nature (e.g., gasoline). Of course, leakage can be even more severe in older tanks in which minimal or no lining exists. Indeed, many tanks at service stations have been in existence since at least the 1950's.

Upon release of such organic contaminants to the environment, a portion of the contaminants may volatilize harmlessly into the atmosphere in the gas phase. However, a significant portion of the contaminants may be released to the earth's subsurface in the liquid phase. In this respect, the release of organic compounds into the earth's subsurface can result in a plume of dissolved and pure phase organic compounds that can travel (e.g., down-gradient) with natural groundwater flow within a water-holding geologic unit known as an aquifer. Such contaminated subsurface water can travel hundreds of meters in a year, can be accidentally extracted in well-water, and can eventually surface in rivers and streams. Thus, even though this form of contamination is generally "invisible," it has significant deleterious environmental ramifications.

Prior approaches for containing such environmental contamination have not been fully satisfactory. For example, a common approach for handling the contamination is known as the "pump and treat" method. The "pump and treat" method entails pumping out pollutant-containing water from the earth's subsurface. The contaminated water is treated to remove the contaminants and then returned to its original subsurface location. However, the "pump and treat" method suffers from a number of drawbacks. In particular, it has proven to be very difficult to track the location of additional pollutants after treated water is returned to the earth's subsurface. In addition, the "pump and treat" method requires continual monitoring and pumping over a very long period of time (e.g., 20 or more years), and is therefore cumbersome and expensive.

Other strategies for addressing this problem have included air purging to remove volatile components, bioremediation, and soil removal. With respect to bioremediation, nutrients and oxygen are provided in the earth's subsurface to allow natural microbial communities to break down organic material. Meanwhile, soil removal is utilized especially in instances where the contamination occurs near ground-level. The removed soil then is incinerated at a temperature sufficiently high to remove the contaminants by combustion. However, these other approaches also are generally poorly effective, expensive (e.g., more than $1 million per acre for soil removal), and/or can require decades of active remediation.

Another major pollution problem relates to spent fluids from various industrial processes. For example, contaminated aqueous fluids are produced from offshore oil well recovery processes. Particularly, seawater is pumped out with oil, and often, various additives are included. Even after the oil is separated from the water, the water nevertheless includes various hydrocarbon contaminants (e.g., toluenes, benzenes, and the like). Heretofore, it has proven to be very difficult to properly treat (e.g., filter) the water before it is returned to the sea, thereby posing a significant environmental contamination problem.

Accordingly, it will be appreciated from the foregoing that there exists a need in the art for techniques for trapping organic compounds and, if desired. retaining them in trapped form for long periods of time. There is also a need for such techniques which also allow for extraction of the trapped organics at a later date, as desired. It is an object of the present invention to satisfy these needs. These and other objects and advantages of the present invention, as well as additional inventive features, will be apparent from the description of the invention provided herein.

BRIEF SUMMARY OF THE INVENTION

In one aspect, the present invention provides a polymer-micelle complex. The polymer-micelle complex comprises a negatively charged micelle which is electrostatically bound to a polymer bearing a positive charge.

In another aspect, the present invention provides a composition comprising an aqueous carrier, a micelle, and a polymer. In the composition, the micelle and polymer can remain separated, or, if desired, the polymer and micelle can electrostatically bind to form a complex, which can either be soluble or in the form of a precipitate or coacervate.

In addition, the present invention provides certain products and methods pertaining to the inventive complex and/or the inventive composition. For example, the present invention provides a filter, a method of treating fluids, a method of trapping organic contaminants, and a method of inhibiting seepage of organic contaminants.

Advantageously, the present invention provides a benign approach for removing organic contaminants without requiring continual processing and monitoring. In particular, the present invention permits organic compounds to be trapped and retained in trapped form for long periods of time. In addition, the present invention allows for extraction of the trapped organics at a later date, as desired.

The present invention will be more fully understood upon reading the following detailed description in conjunction with the accompanying drawings.

BRIEF DESCRIPTION OF THE DRAWINGS

FIG. 10 schematically illustrates treatment of CPG with polycation PDADMAC and negatively charged TX100-SDS mixed micelles.

DETAILED DESCRIPTION

Figure 1:
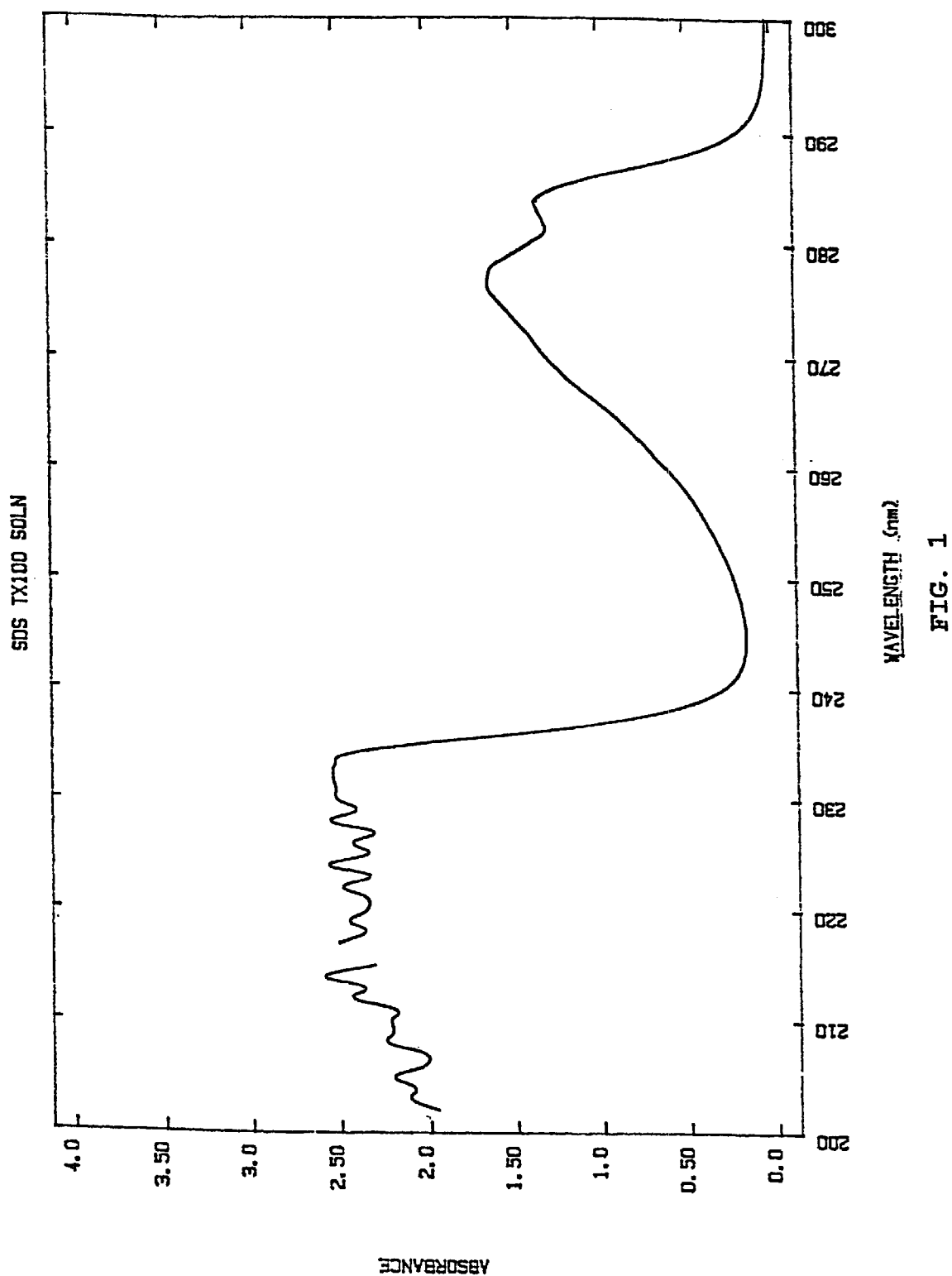
FIG. 1 is a graph (reference spectrum) of absorbance as a function of wavelength of a micellar solution composition identified herein as solution "B".

The present invention is predicated, at least in part, on providing polymer-micelle complexes which are capable of binding to siliceous surfaces (e.g., sand, fiberglass, and the like) so as to form bound complexes. Desirably, the bound micelles then can be used to solubilize organic compounds (e.g., contaminants), so that the organic compounds are immobilized.

The micelles are in the form of aggregated surfactants. In particular, surfactant molecules, which include a hydrophobic end (i.e., the tail) comprising an organic chain (e.g., having 8–20 units) and a hydrophilic end (i.e., the head), cluster together into micellar aggregates when combined. Each micelle can include any suitable number of surfactant molecules. Strictly by way of example, each micelle can include from about 50 to about 500 surfactant molecules. Generally, the micelles form a substantially spherical, spheroidal, or ellipsoidal shape.

In accordance with the present invention, the micelles are designed so that they exhibit a negative charge. Preferably, the negative charge is provided by combining anionic surfactants and nonionic surfactants such that "mixed micelles" are produced. As such, some of the surfactants forming the micelles preferably have anionic-hydrophilic heads while other surfactants in the micelles preferably have nonionic-hydrophilic heads.

The surfactants preferably are combined in an aqueous carrier such that the micelles form spontaneously. The ratio of anionic surfactants to nonionic surfactants in the micelles is adjustable and can vary widely depending on, for example, the extent of negative charge that is desired and the ionic strength (salinity) of the medium in which the surfactants are combined. In particular, the ratio of anionic surfactants to nonionic surfactants controls the micelle charge density, and therefore, controls the strength of the micelles' interaction with the cationic polymer. As will be discussed herein below, such modulation is important when media of varying salinity are involved.

Any suitable anionic surfactant and nonionic surfactant, including combinations thereof, can be incorporated into micelles according to the invention. Suitable examples of anionic surfactants include, but are not limited to, alkyl aryl sulfonates (e.g., alkylbenzenesulfonates), polyalkoxy carboxylates, N-Acylsarcosinates, acylated protein hydrolysates, short-chain alkylarenesulfonates, lignosulfonates, naphthalenesulfonates, α-olefinsulfonates, petroleum sulfonates, dialkyl sulfosuccinates, amidosulfonates, 2-sulfoethyl esters of fatty acids, fatty acid ester sulfonates, alcohol sulfates, ethoxylated alcohol sulfates, sulfated alkylphenol ethoxylates. sulfated acids, amides, and esters, sulfated natural oils and fats, phosphate esters, and the like, and combinations thereof.

Suitable nonionic surfactants can include, for example, alcohol ethoxylates, alkylphenol ethoxylates, glycerol esters, polyoxyethylene esters, ethoxylated anhydrosorbitol esters, natural ethoxylated fats, oils, and waxes, glycol esters of fatty acids, alkyl polyglycosides, diethanolamine condensates, monoalkanolamine condensates, polyoxyethylene fatty acid amides, fatty acid glucamides, polyalkylene oxide block copolymers, poly(oxyethylene-co-oxypropylene), and the like, and combinations thereof (e.g., surfactants of the TRITON®, TWEEN®, and NEODOL® series, respectively).

To permit the micelles to bind to a siliceous material (e.g., sand), at least one polymer characterized by a positive charge (i.e., a polycation) is added to the aqueous medium containing the micelles, pursuant to the present invention. In this respect, the positive charge of the polycations can result in electrostatic (noncovalent) bonds between the polycations and the negatively-charged micelles such that polymer-micelle complexes can form under certain conditions, as discussed in more detail herein below. In addition, the positively charged polymers also can adsorb electrostatically to siliceous materials, which are negatively charged (e.g., because they bear silanol groups). As a result, by forming polymer-micelle complexes, the micelles can be bound to siliceous materials such as sand, thereby rendering the polymer-micelle complexes immobilized.

It is noteworthy that, by using a polymer to facilitate attachment of the micelles to siliceous materials, the present invention desirably does not perturb the structure of the micelles nor the organic contaminant-adsorbing nature thereof. By way of comparison, if the micelles were undesirably designed to be cationic and then adsorbed directly on siliceous materials absent a polymer, it is believed that the micellar structure and stability would be compromised such that the capacity of the micelles to solubilize organic contaminants would be diminished. Accordingly, a significant advantage of the present invention is that the micelles serve to solubilize organic contaminants even when entrapped onto siliceous materials while in the form of polymer-micelle complexes.

Any suitable polycation (including copolymers having at least one cationic portion) can be utilized in accordance with the present invention. Also, the polycation can have any suitable molecular weight, e.g., typically ranging from about 20,000 daltons to about 2,000,000 daltons. Preferably, the polycations can have a molecular weight of at least about 100,000 daltons. Strictly by way of example, the polymer can be poly(dimethyldiallylammonium chloride) (PDADMAC), poly(methacrylamidopropyltrimethyl ammonium chloride (PMAPTAC), poly(L-Lysine), poly(L-Arginine), poly(4-vinylpyridinium salt), polyethyleneimine (PEI), or cationic equivalents of similar or related polymers, or the like, or combinations thereof. It will be appreciated that, in the context of the invention, the term "polycations" includes copolymers such as those having a cationic portion and a nonionic portion.

The ability of the micelles to bind electrostatically to the polycations can be controlled, for example, by adjusting the micelle charge density and/or by adjusting the ionic strength (i.e., salinity) of the aqueous medium. With respect to the former, pursuant to an embodiment of the invention, the charge density of mixed micelles can be varied by adjusting the ratio of anionic surfactants to nonionic surfactants that are present. Particularly, by increasing the negativity of the micelles, the electrostatic adherence between the micelle and the polymer is enhanced.

The ionic strength, i.e., salinity, of the aqueous medium also impacts the ability of the micelle to form a complex with the polymer. In this respect, by adding excess salt (e.g., sodium chloride or the like) in the aqueous medium, the salinity of the medium increases. The presence of the salt in the aqueous medium serves to inhibit (or screen out) interactions between the negatively charged micelles and the positively charged polycations. Accordingly, depending upon the salinity of the aqueous medium, the amount of anionic surfactant that is present in the micelles relative to the amount of nonionic surfactant included in the micelles can be adjusted (and vice-versa, i.e., the salinity of the medium can be adjusted depending upon the proportion of anionic surfactants present in the micelles), depending upon the electrostatic binding characteristics desired.

For example, the proportion of anionic surfactant (relative to nonionic surfactant) in the micelles can be characterized, for example, by the variable Y, which represents the molar concentration of anionic surfactant divided by the sum of the molar concentration of anionic surfactant and the molar concentration of the nonionic surfactant. As the value of Y (which can be from 0, i.e., purely nonionic, to 1, i.e., purely anionic) decreases, the aqueous medium must have a lower salinity to achieve the formation of a soluble complex between polycations and the micelles. Conversely, at relatively high Y values, the medium must have a higher salinity so that the soluble complex can be formed. As such, the range of ionic strength for establishing a soluble complex can vary, depending upon the value of Y. For example, depending upon the value of Y, the ionic strength of the aqueous medium can be in a range of from about 0.01 M to about 1 M.

In particular, in the aqueous medium, the relationship between the polycations and micelles can be in three distinct phases. A first phase relates to an aqueous medium having a high salinity relative to the value of Y of the micelles in the medium such that no complex forms between the polycations and the micelles. As the salinity of the aqueous medium decreases, at constant Y, a shift to a second phase will occur. In the second phase, a soluble complex between the polycations and micelles will form. As the salinity is reduced even further, again at constant Y, the third phase will result. In the third phase, the complex will form a precipitate or coacervate. In this respect, it will be appreciated by one of ordinary skill in the art that a coacervate pertains to a typically dense viscous aqueous phase, concentrated in polymer and surfactant micelles, that spontaneously separates from a dilute solution of the same under certain conditions.

As a result, the amount of anionic surfactant relative to the amount of nonionic surfactant can vary widely, depending upon, for example, the ionic strength of the medium. By way of example, and not limitation, the ratio of anionic surfactant to nonionic surfactant in the micelles can be from about 9:1 to about 1:9. At relatively high salinity values (e.g., over about 0.7 M), the amount of anionic surfactant should be high relative to the amount of nonionic surfactant (e.g., a value of Y of at least about 0.7 or a ratio of at least about 7:3 of anionic surfactants relative to nonionic surfactants in the micelles). Conversely, at relative low salinity values (e.g., about 0.2 M or lower), the amount of anionic surfactant should be low relative to the amount of nonionic surfactant (e.g., a value of Y of less than about 0.2 or a ratio of less than about 2:8 of anionic surfactants relative to nonionic surfactants in the micelles). Accordingly, at constant Y, the particular phase in which the polycations and micelles exist (i.e., no complex, soluble complex, or precipitate/coacervate) can be varied depending upon the salinity of the medium containing the polycations and the micelles. As the salinity of the aqueous carrier decreases, there is less opportunity for salts in the carrier to interfere with charge interactions between the polymer and the micelles such that a soluble complex results, and eventually (as salinity in the carrier decreases further), the complex forms a precipitate/coacervate.

In some embodiments, the ratio of anionic surfactants to nonionic surfactants in the micelles is relatively low, preferably about 3:7 or lower, more preferably, about 1:9. Embodiments with such lower ratios of anionic surfactants to nonionic surfactants in the micelles are especially desirable in the event that the existence or phase of the polymer-micelle complex is sought to be controlled via the salinity of the aqueous medium. For example, where the proportion of anionic surfactants to nonionic surfactants is relatively low (e.g., 3:7 or lower), the polymers and micelles can be prevented from forming a soluble complex by establishing the salinity of the aqueous medium at a level which is sufficiently high to prevent complex formation (e.g., to about 500 millimolar, i.e., about 0.5 M). Then, the complex formation can be activated by reducing the salinity of the aqueous medium (e.g., by dilution via addition of water) to a point where the soluble micelle-polymer complex forms (e.g., at a salinity of about 100 millimolar, i.e., about 0.1 M). Furthermore, the salinity can be reduced even more or even eliminated such that the complex forms a precipitate/coacervate.

In accordance with one aspect of the present invention, the polycations and micelles can be added to an aqueous medium and delivered to the earth's subsurface (e.g., a subterranean location) in order to solubilize organic contaminants (e.g., non-aqueous phase liquids) therein. In this respect, the micelles can be provided in an aqueous medium which preferably includes one or more salt (e.g., sodium chloride) such that the medium is imparted with salinity. Polymer in the form of polycations is added to the medium. Significantly, prior to delivery to the earth's subsurface, the polycations and micelles can be in the medium without forming a complex, or alternatively, in the form of a soluble complex.

Once contamination by organic compounds (e.g., benzene, toluene, xylene, gasoline, or the like) is detected (e.g., by way of testing of soil samples) the inventive aqueous fluid (containing polycations and micelles or soluble complexes thereof) can be delivered to the contaminated subsurface location. For example, as will be appreciated by one of ordinary skill in the art, the inventive aqueous fluid can be delivered via pumping through piping or tubing (e.g., a well) having apertures (e.g., drill holes) therein such that the apertures are selectively aligned so as to release the inventive aqueous fluid at one or more locations where contaminants (e.g., in the form of a plume) are detected and where siliceous materials (e.g., sand) are present.

As the inventive aqueous fluid is released, the fluid is diluted (e.g., by contact with water, for example, from an aquifer) such that the salinity of the aqueous carrier decreases. Accordingly, since the salinity (ionic strength) decreases at constant Y, a soluble polymer-micelle complex will form (if not formed already prior to the release of the aqueous fluid to the earth's subsurface). The polymer-micelle complex will electrostatically bind to siliceous materials present in the earth's subsurface (e.g., sandy soil around an aquifer). As the salinity of the aqueous fluid is reduced even further or eliminated, the polymer-micelle complex will form a precipitate/coacervate when electrostatically bound to the siliceous materials.

As a result, the polymer-micelle complexes bound to the siliceous materials present in the earth's subsurface serve as a solubilizing barrier which traps (e.g., solubilizes) and immobilizes the organic contaminants (e.g., a plume) in situ. Advantageously. once attached to the siliceous materials in the subsurface, the polymer-micelle complexes remain in place and desirably do not wash away even upon exposure to groundwater or rainwater, which do not have sufficient salinity to separate the polycations from the micelles so as to "break apart" the complex.

Notably, the present invention does not require continual monitoring once installed. The inventive polymer-micelle complex can be left in the desired subsurface locations or, alternatively, removed (e.g., extracted) after a period of years (e.g., 20 years) so that the pollutants are removed from the earth, if desired. For example, in order to extract the polymer-micelle complex from the earth's surface, a reverse-pumping process can be utilized. Particularly, a high salinity fluid (e.g., seawater) can be delivered to the earth's subsurface so that the salts in the fluid interfere with the electrostatic interactions between the polycations and micelles on one hand and also between the polycations and the siliceous materials on the other hand. Although the micelles are thus separated from the polycations, the organic contaminants remain trapped in the micelles. Accordingly, the micelles (including organic contaminants therein) and polycations can be removed from the siliceous materials, re-dispersed in a high salinity solution, and pumped back out of the earth along with pollutants, as will be appreciated by one of ordinary skill in the art.

If desired. the inventive polymer-micelle complex can be delivered subterraneously even before contamination is detected as a prophylactic measure. In particular, the polymer-micelle complex can be delivered to inhibit the seepage of any organic contaminants that might be present in a subsurface location. As discussed herein above, the polymer-micelle complex can be delivered so as to contact at least one siliceous material in the subsurface location so as to immobilize the complex on the siliceous material. Then, the immobilized complex can capture any organic contaminants that might exist at the subsurface location. By way of example, the immobilized complex (i.e., the polymer-micelle complex as electrostatically bound to a siliceous material) can be utilized as fill in which underground storage tanks can be embedded. As such, the inventive immobilized complex could trap any material that may leak over time from the tanks. Furthermore, the immobilized complex could be recharged periodically (e.g., by flushing with high ionic strength solutions then by reinsertion of new polymer-micelle complexes).

In accordance with another aspect of the present invention, the polymer-micelle complexes can be utilized to treat (e.g., to filter) fluids, such as aqueous fluids, so as to reduce the content of contaminants therein. In this respect, the polymer-micelle complexes can be utilized in a filter element for use in, for example, a coarse filter. Particularly, the polymer-micelle complexes can be adsorbed onto a siliceous material (e.g., a fiberglass sheet) as described herein. For example, the polymer-micelle complex can be formed in an aqueous fluid having salinity. After forming the soluble polymer-micelle complex, the salinity can be reduced or eliminated as the polymer-micelle complex electrostatically binds to the fiberglass as a precipitate/coacervate, as described herein above. The fiberglass containing the polymer-micelle complex can then be incorporated into a filter element, as will be appreciated by one of ordinary skill in the art.

The filter element according to embodiments of the invention optionally can include suitable binders that are compatible with the polymer-micelle complex as electrostatically attached to the fiberglass. The binders can be provided in any suitable manner and in any suitable amount, as will be appreciated by one of ordinary skill in the art (e.g., from about 1% to about 30% by weight of the filter element). In addition, if desired, other reinforcing materials can be included in the filter element, for example, to enhance the mechanical strength of the filter element. such as, for example, glass fibers and/or support substrates.

The filter element according to embodiments of the invention can have any suitable pore structure, e.g., pore rating, such as a pore rating ranging from submicron (e.g., 0.01 $\mu$m) to 100 $\mu$m or larger, more preferably a pore rating ranging from about 0.1 $\mu$m to about 2.0 $\mu$m. Similarly, the filter element can have any suitable void volume. The preparation of filter elements with particular pore ratings and void volumes is within the ordinary skill in the art.

By way of example, the filter element according to embodiments of the invention can be utilized to treat spent fluids, such as, for example, aqueous fluids from offshore oil well recovery processes (e.g., from platforms). Even after oil is separated from the aqueous fluid pursuant to these types of processes, the aqueous fluid still contains fractions of organic compounds (e.g., hydrocarbons, such as toluenes and benzenes) and, therefore, can be treated in accordance with embodiments of the invention.

In accordance with embodiments of the invention, methods for treating fluids (e.g., spent aqueous fluids from offshore oil well recovery processes) include, for example, passing the fluid through the filter element. In this respect, the fluid can be passed from a first, or upstream, side of the element, to a second, or downstream, side. The fluid could also be passed tangentially to the first surface of the element. For example, a portion of the fluid could be allowed to pass from the first surface to the second surface, while another portion could be allowed to pass across the first surface. If desired, the treated fluids can be recycled.

The following example further illustrates the present invention, but, of course, should not be construed as in any way limiting its scope.

EXAMPLE I

The purpose of this example was to determine if controlled pore glass (CPG), having been treated with a polycation (poly(dimethyldiallylammonium chloride) or PDADMAC) would then adsorb mixed micelles of sodium dodecyl sulfate (SDS) and a nonionic surfactant (Triton X-100, from Aldrich, CAS 9002-93–1).

Particularly, controlled pore glass (from Schott Gerate, Batch 91193/00) of 30–60 $\mu$m diameter with pores of 48.4 nm was washed at room temperature for 1 to 2 hours in a 1% SDS (from Fluka) pH 9 NaOH solution as advised by the manufacturer. The CPG was then rinsed with DI (deionized) water until no foaming was observed, and oven dried at 50° C. overnight. Samples of about 0.2–0.4 g CPG were then gently agitated with PDADMAC (Merquat 100 from Calgon, 10 g/l) in a pH 8 buffer solution of 2-Amino-2-(hydroxymethyl)-1,3-propanediol (tris, from Eastman Kodak) at ionic strengths (I) of 0.5 M (due to NaCl) and 1 mM (no NaCl, I was due to the HCl used to make the buffer solution) for about 24 hours. The CPG was then centrifuged, rinsed in DI water (4x–5x) with shaking, and oven dried at 50° C. overnight.

The CPG was then gently agitated at room temperature with 15 ml of a 1 g/l, pH 6.3 solution of SDS and Triton containing an approximately 1/1 molar ratio of each. The molar ratio can be expressed as Y, where Y=[SDS]/[SDS]+[Triton]. Thus, all of these experiments were performed at about Y=0.5. This part of the experiment was repeated at I of both 0.5 M (NaCl) and 1 mM. Table 1 lists the compositions of the micellar solutions used in these experiments.

TABLE I

Micellar solution compositions (solution D was used to construct a calibration curve)

|   | SDS (g) | SDS (mM) | Triton (g) | Triton (mM) | NaCl (g) | I (mM) | Conc. (g/l) | [SDS]/[Triton] | Y |
|---|---------|----------|------------|-------------|----------|--------|-------------|----------------|---|
| A | 0.1679  | 1.184    | 0.3418     | 1.094       | 0        | 1.164  | 1.0194      | 1.0643         | 0.5156 |
| B | 0.085   | 1.179    | 0.1684     | 1.078       | 7.3020   | 501.0  | 1.0136      | 1.0936         | 0.5224 |
| C | 0.0873  | 1.211    | 0.185      | 1.184       | 0        | 1.211  | 1.0892      | 1.0224         | 0.5055 |
| D | 0.0848  | 1.176    | 0.1808     | 1.157       | 0        | 1.176  | 1.0624      | 1.0162         | 0.5040 |

Figure 9:
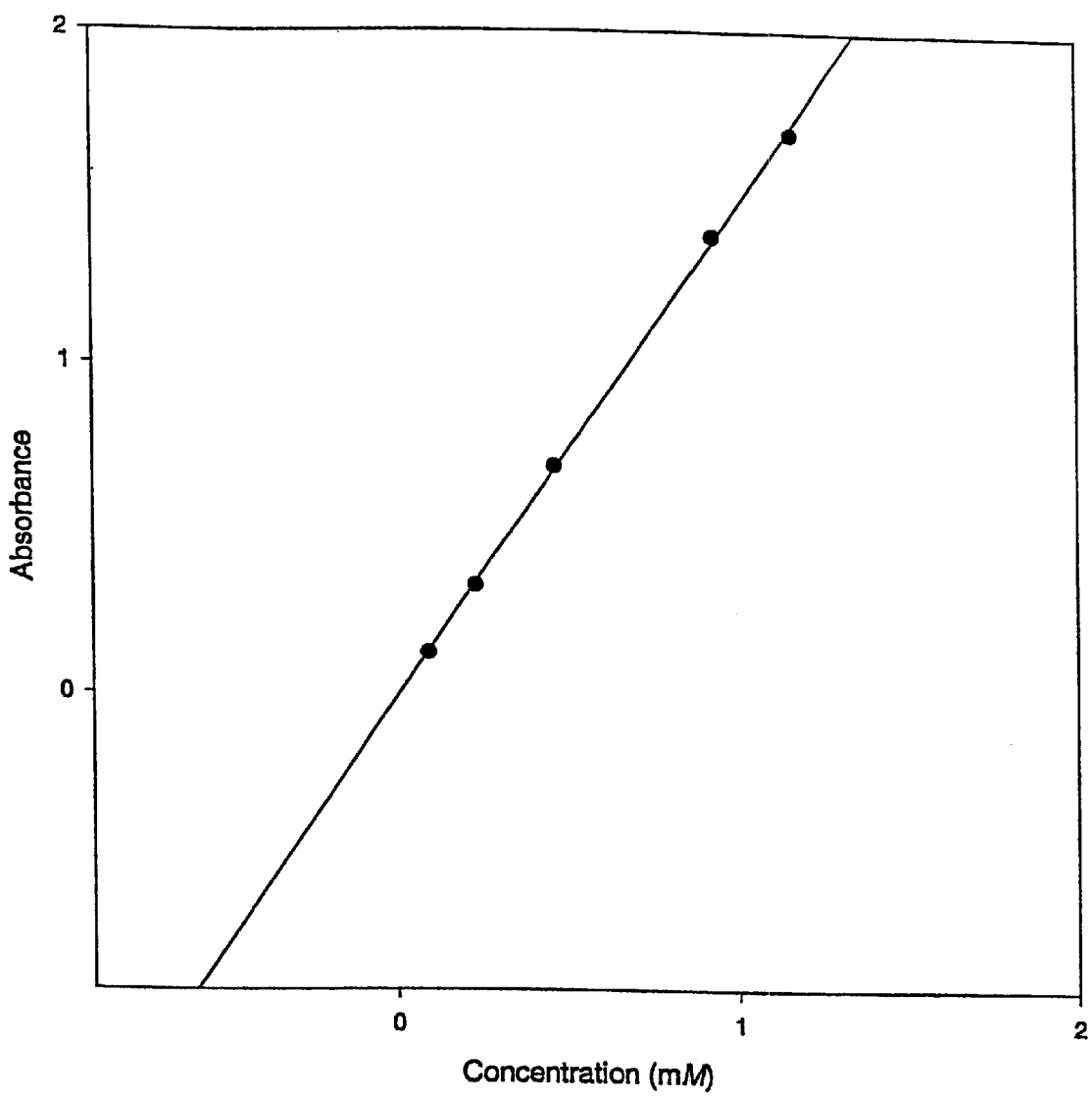
FIG. 9 is a graph illustrating a calibration curve for the micellar solution composition from FIG. 7 at 276 nm.

The adsorbance of micelles was monitored by UV-Visible spectrometry (Hewlett Packard 8450A Diode Array Spectrophotometer). Triton absorbs at 276–277 nm and 283–284 nm in DI water. An additional peak occurred at 222–223 nm but absorbance below about 230 nm was too strong to measure at these concentrations. A calibration curve was constructed using solution D (Table 2 and FIG. 9).

TABLE 2

Calibration Curve Data for Triton X-100

| λ (nm) | 0.09259 mM A | 0.4830 mM A | 1.1574 mM A | 0.2315 mM A | 0.9259 mM A | $r^2$ | Slope | Intercept |
|---|---|---|---|---|---|---|---|---|
| 276 | 0.122 | 0.690 | 1.696 | 0.325 | 1.386 | 1.000 | 1.490 | −0.0116 |
| 277 | 0.114 | 0.684 | 1.670 | 0.314 | 1.370 | 0.999 | 1.475 | −0.0165 |
| 283 | 0.087 | 0.551 | 1.387 | 0.247 | 1.124 | 1.000 | 1.232 | −0.0278 |
| 284 | 0.076 | 0.529 | 1.378 | 0.226 | 1.107 | 1.000 | 1.236 | −0.0463 |

As a control, washed CPG untreated with polymer was put into contact with solutions B and C.

Five ml of dye solution (1-(o-Tolylazo)-2-naphthol, or Orange OT, from Aldrich, a few mg in about 30 ml 95% ethanol) was added to treated and untreated CPG in the presence of about 10 ml SDS-Triton at low I in a glass scintillation vial. This dye, i.e., Orange OT, is a water-insoluble, nonpolar compound, and is used to model non-aqueous phase liquids (organic contaminants) and has been used often in published studies to monitor the solubilizing power of detergent micelles. (The concentration of SDS-Triton and I were uncertain. This solution was the rinse from an experiment to determine whether treated or untreated CPG retained mixed micelles better. The results were equivocal).

Unless otherwise noted, these experiments were performed in plastic (believed to be Nalgene) scintillation vials.

To demonstrate the practical application of these experiments, 5 g of medium sized quartz sand (99% quartz, 1% dark minerals, obtained from the IUPUI chemistry supply room and used without further preparation) was treated with polymer (gently agitated about 24 H in a 10 g/l polymer, pH 8, 0.5 M NaCl solution). This treated sand was then sandwiched between two layers of untreated sand in a 50 ml burette. The lowermost layer of sand had a volume of about 9 ml, the treated about 12 ml, and the upper layer 11 ml. About 18 ml of very concentrated dye solution was added to 100 ml of SDS-Triton (Solution C from Table 1) and this solution was poured into the burette.

Figure 2:
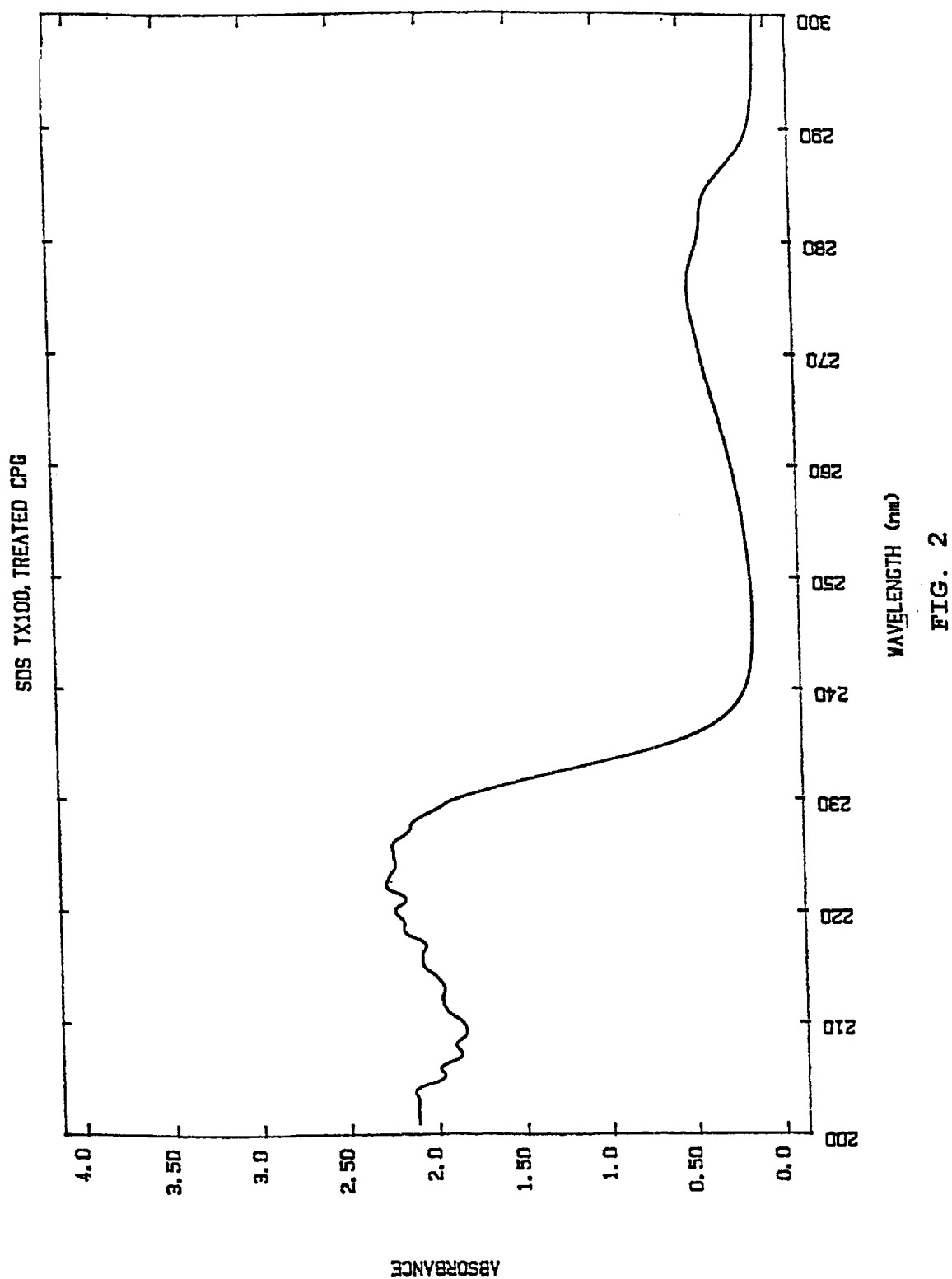
FIG. 2 is a graph (reference spectrum) of absorbance as a function of wavelength of the micellar solution composition from FIG. 1, but after contact with treated controlled pore glass (CPG).
Figure 3:
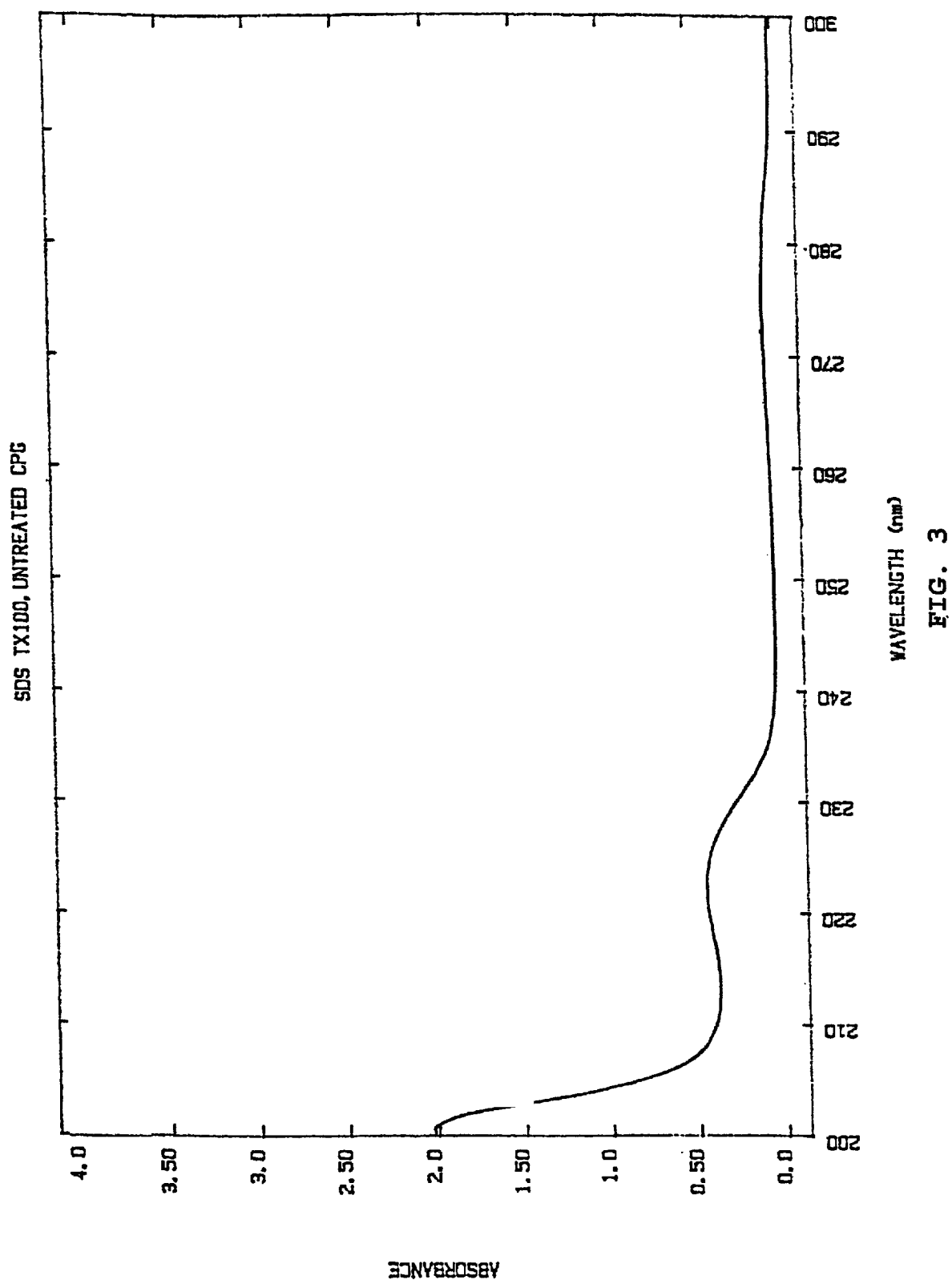
FIG. 3 is a graph (spectrum) of absorbance as a function of wavelength of the micellar solution composition from FIG. 1, but after contact with untreated CPG.

Mixed micelles of SDS-Triton were found to adsorb onto both treated and untreated CPG at I=0.5 M (FIGS. 1–3 and Table 3).

TABLE 3

Absorbance values from spectra (concentrations calculated from the calibration curve)

| | λ (nm) | A | λ (nm) | A | CPG (g) | Conc. (mM) |
|---|---|---|---|---|---|---|
| FIG. 1 | 276 | 1.63 | 283 | 1.346 | 0 | 1.102 |
| FIG. 2 | 276 | 0.04754 | 283 | 0.3874 | 0.3819 | 0.327 |
| FIG. 3 | 276 | 0.0755 | 283 | 0.0593 | 0.4088 | 0.058 |
| FIG. 4 | 276 | 1.72 | 283 | 1.408 | 0 | 1.162 |
| FIG. 5 | 276 | 0.4075 | 283 | 0.3088 | 0.2209 | 0.281 |
| FIG. 6 | 276 | 1.70 | 283 | 1.404 | 0.2176 | 1.149 |
| FIG. 9 | 276 | 1.71 | 283 | 1.405 | 0 | 1.155 |
| FIG. 10 | 276 | 0.3203 | 283 | 0.247 | 0.2267 | 0.223 |

Figure 4:
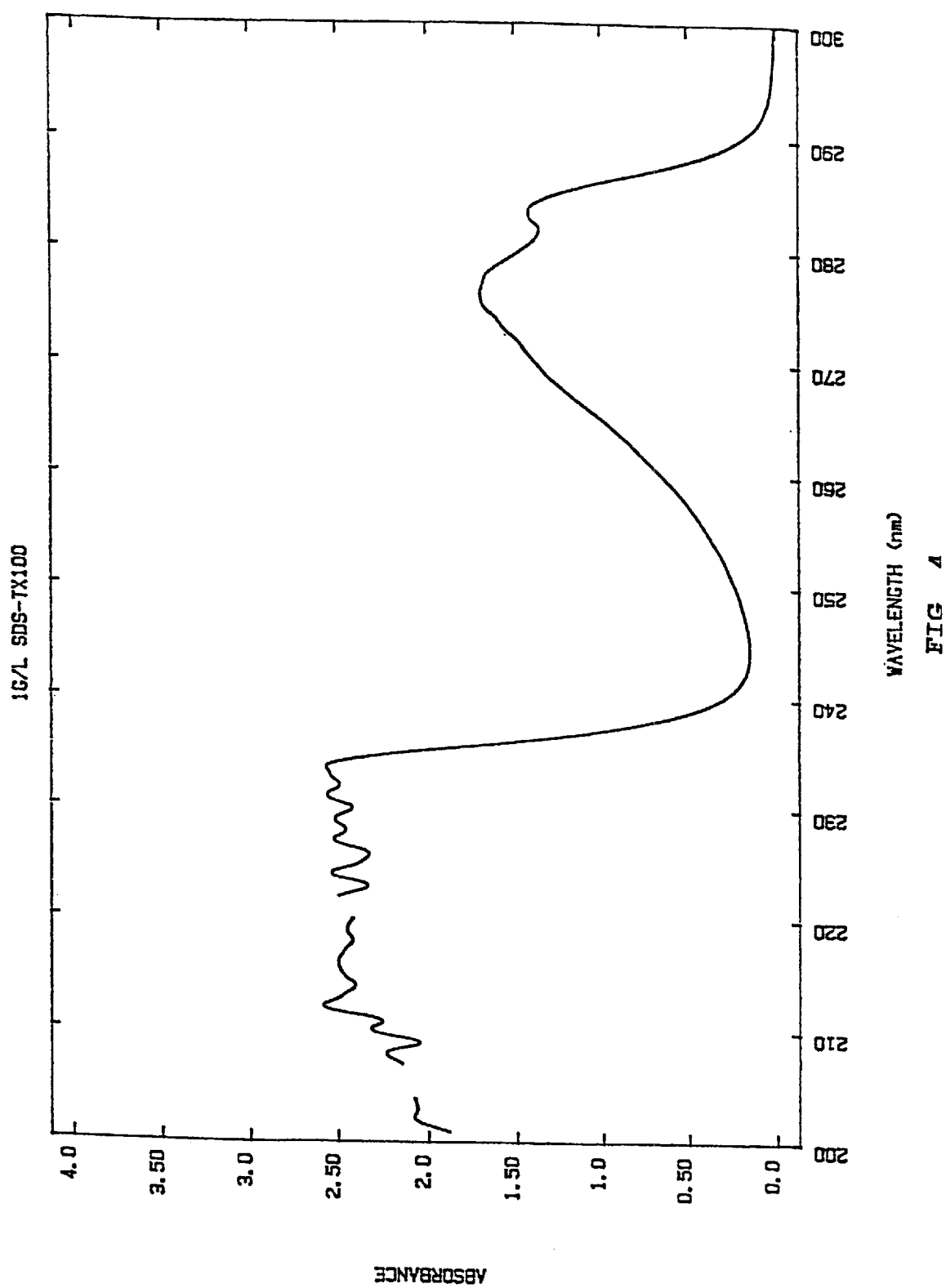
FIG. 4 is a graph (reference spectrum) of absorbance as a function of wavelength of another micellar solution composition identified herein as solution
Figure 5:
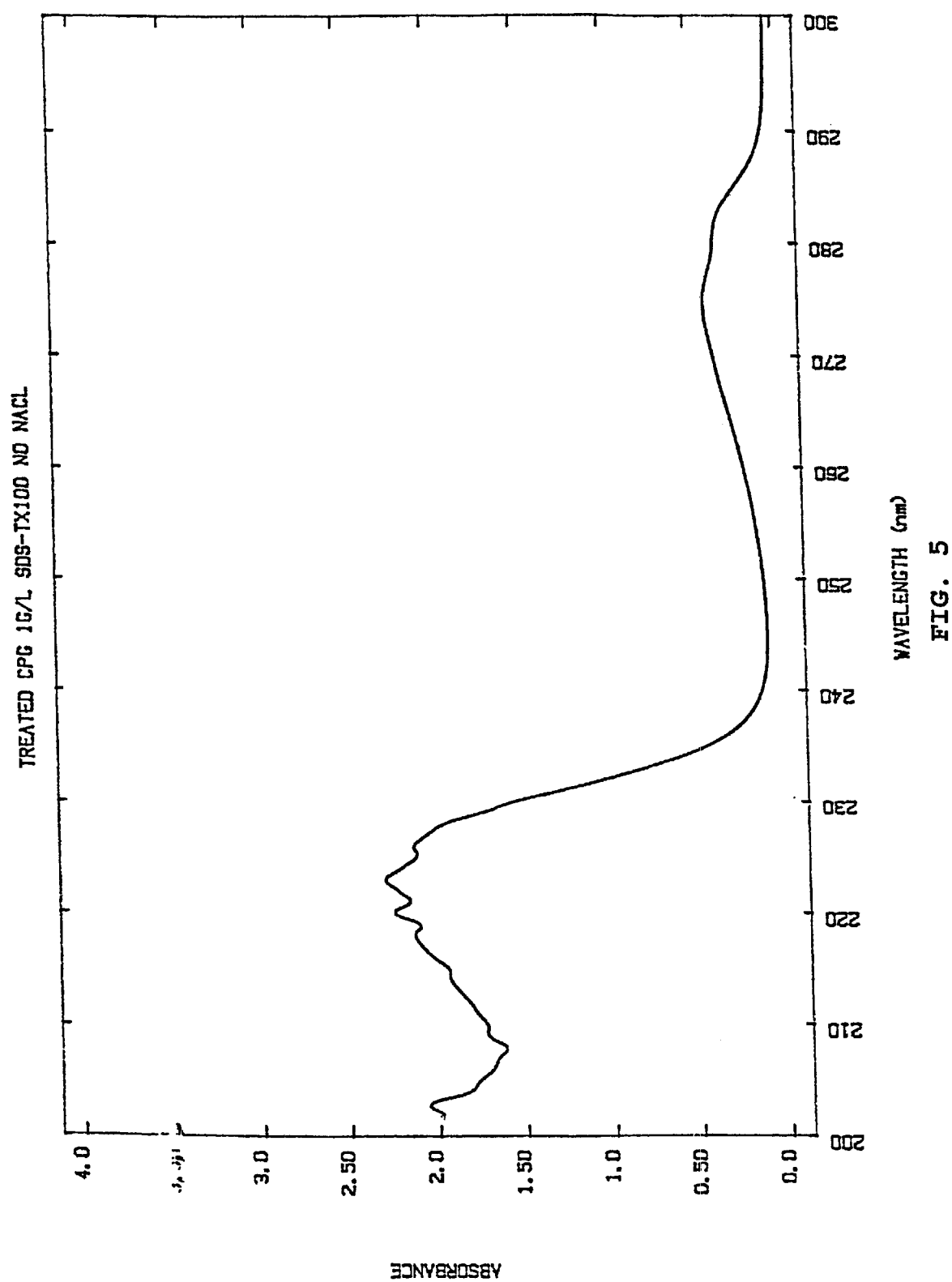
FIG. 5 is a graph (spectrum) of absorbance as a function of wavelength of the micellar solution composition from FIG. 4, but after contact with treated CPG.
Figure 6:
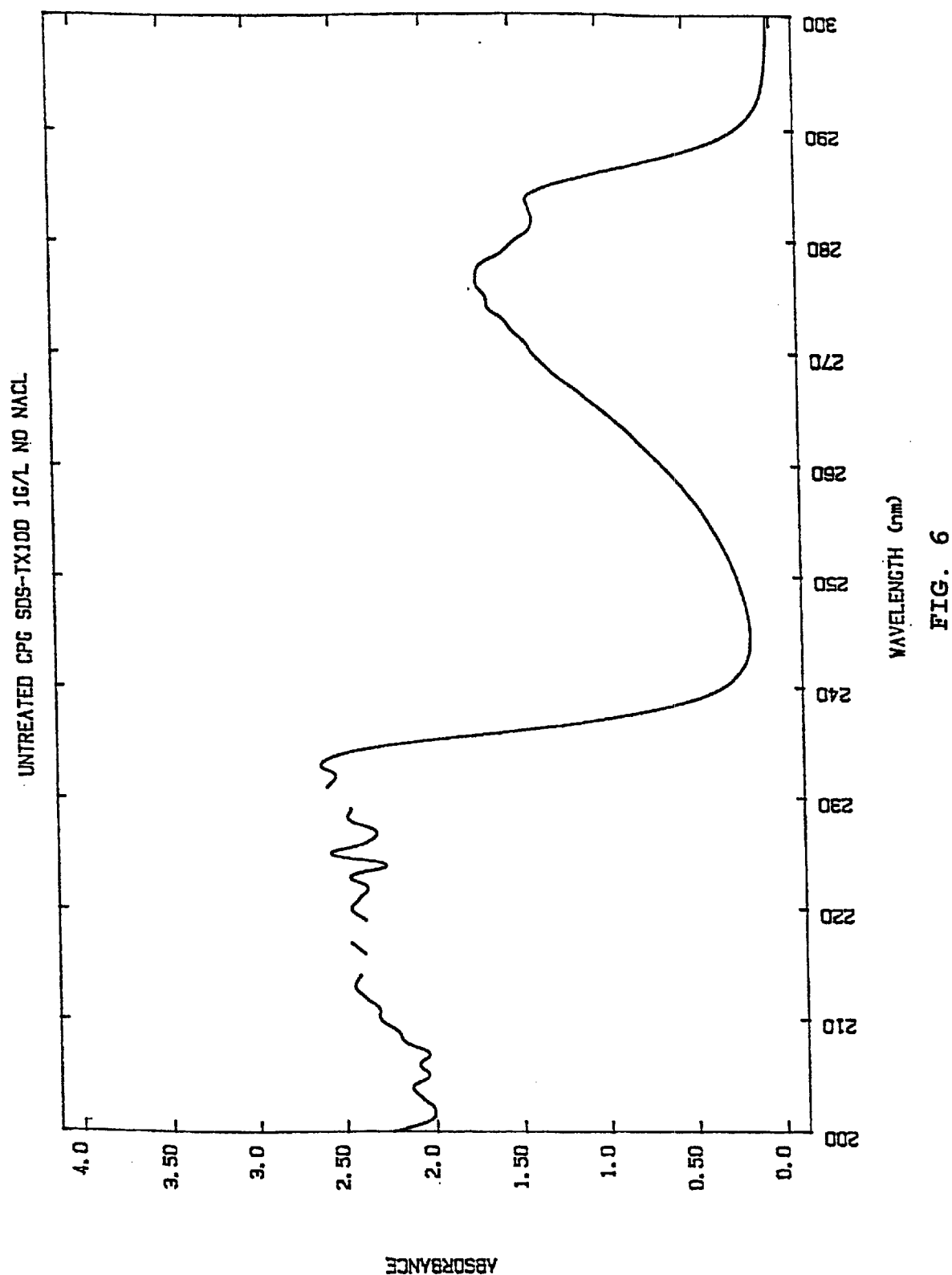
FIG. 6 is a graph (spectrum) of absorbance as a function of wavelength of the micellar solution composition from FIG. 4. but after contact with untreated CPG.
Figure 7:
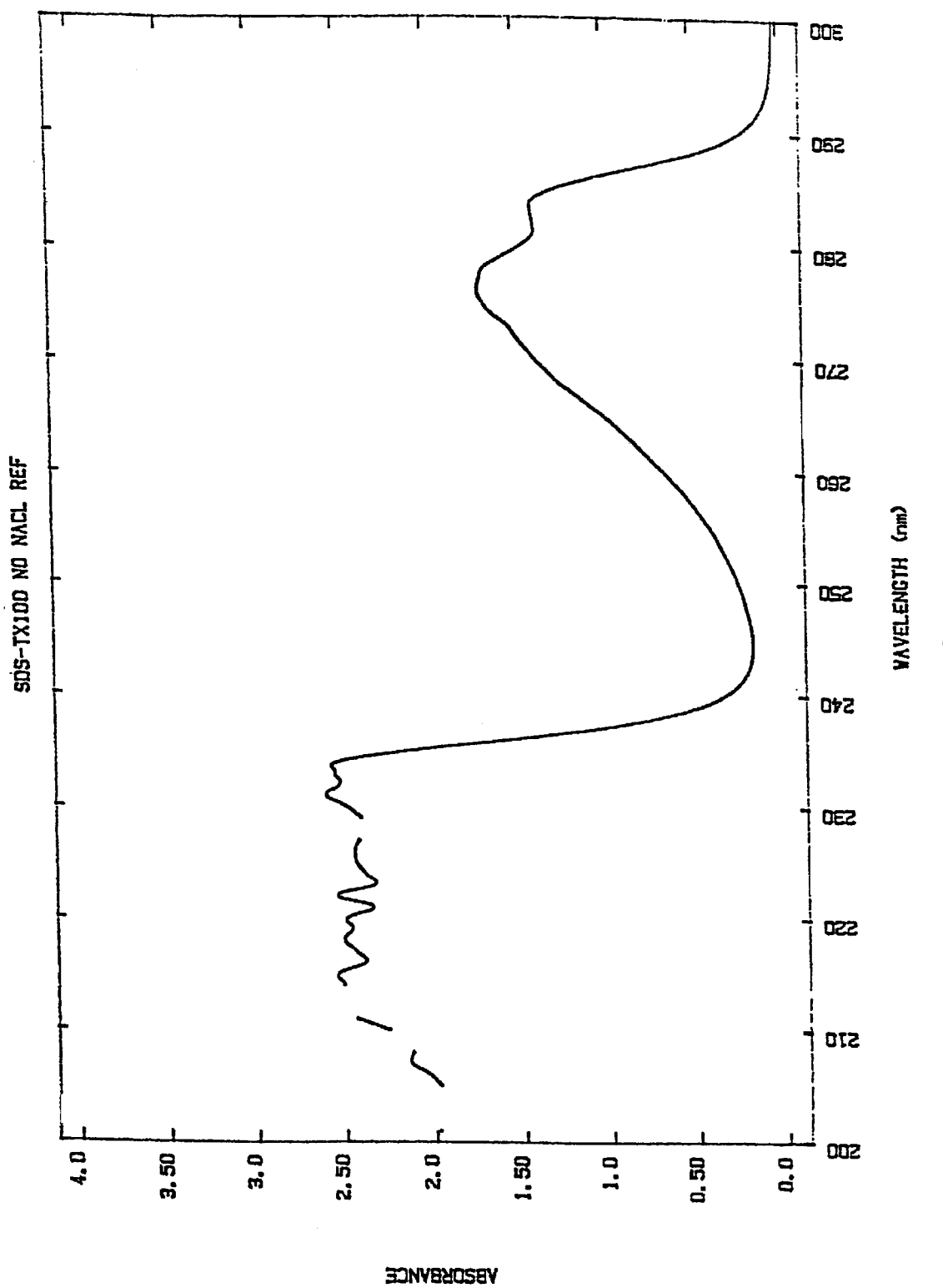
FIG. 7 is a graph (reference spectrum) of absorbance as a function of wavelength of yet another micellar solution composition identified herein as solution "D".
Figure 8:
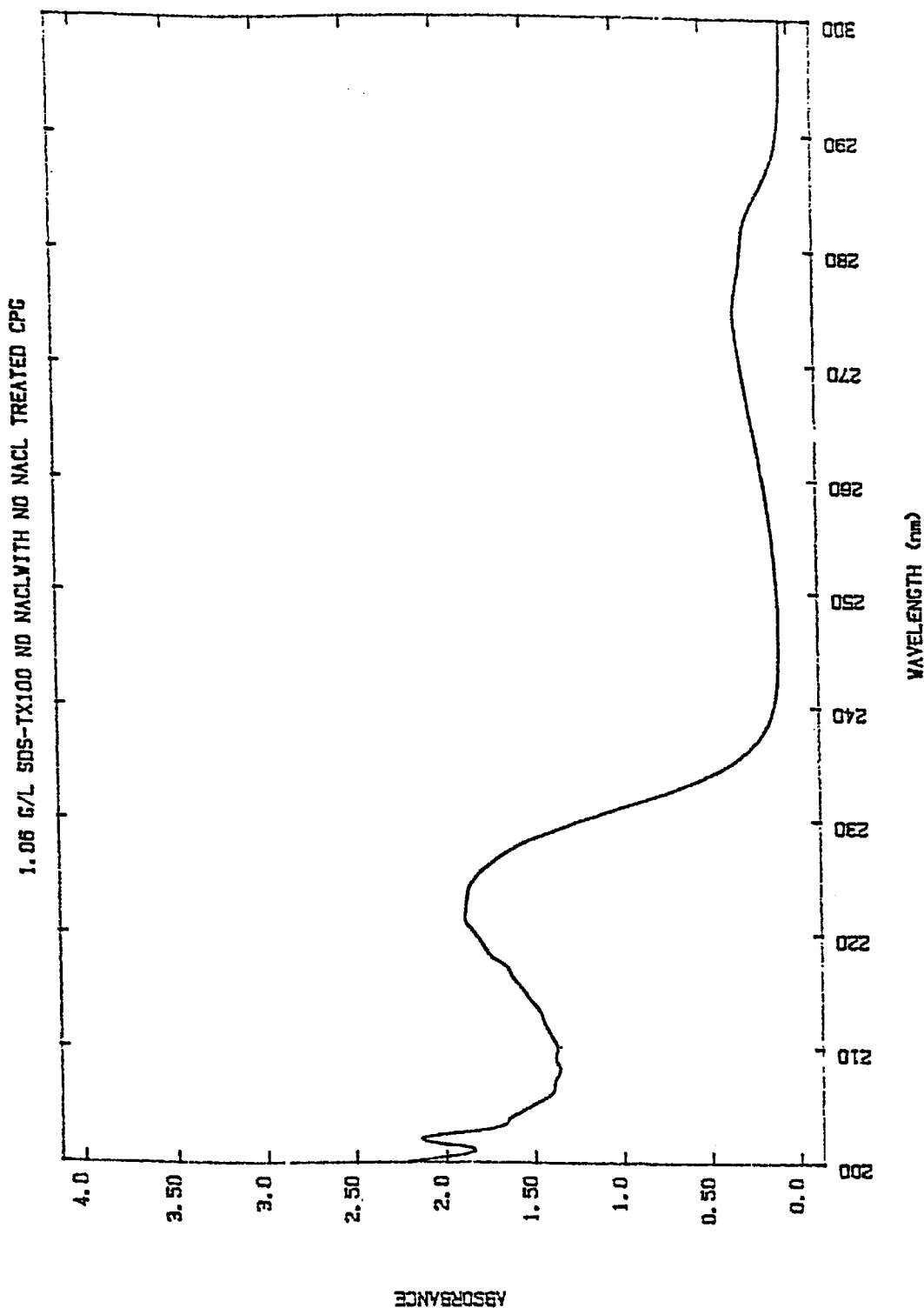
FIG. 8 is a graph (spectrum) of absorbance as a function of wavelength of the micellar solution composition from FIG. 7, but after contact with CPG treated at low I with polymer.

This result is surprising as both the CPG and mixed micelles are negatively charged. Indeed, untreated CPG appears to adsorb more SDS-Triton (FIG. 3) than treated (FIG. 2). Calculations based on FIGS. 1–3 indicate that untreated CPG adsorbs about 0.0382 mmol Triton/g CPG whereas treated adsorbs only 0.0304 mmol Triton/g CPG. (Calculations based on FIG. 5 indicate that treated CPG adsorbs 0.06 mmol Triton/g CPG.) However, in salt-free water no micelles were adsorbed by the untreated CPG (FIGS. 4–6 and Table 3). It is believed that the presence of $Na^+$ ions shields the negative charges from each other. This second result also rules out the possibility that SDS-Triton was adsorbed onto the plastic vials.

In accordance with the foregoing results, treated CPG adsorbs micellar solubilized Orange OT dye in salt-free water but untreated CPG does not. The treated CPG was rinsed in DI water and the rinse appeared clear and colorless. (If plain water is added to an ethanol-dye solution the solution becomes turbid immediately, and after several days the dye settles out of solution.) No change in either sample of CPG could be discerned after 5 days.

The treated quartz sand removed the dye from solution and retained it after rinsing with about 200 ml DI water. The upper contact between the treated and untreated sand is sharp and clear. The first drops of water eluted from the bottom of the column had a very slight yellowish tint, indicating that some dye was not retained. A small amount of dye was retained by the untreated sand near the top of the column. The lower boundary between the treated and untreated sands was diffuse. This is believed to be due to incomplete rinsing of polymer after treating the sand. The polymer also appears to lower the hydraulic conductivity of the column.

As a related matter, a few grams of coarse quartz sand (obtained from IUPUI hydrology lab and used without further preparation) was treated with polymer in salt-free water for about 48 H and sandwiched between layers of untreated medium grained sand in a 50 ml burette. This sand does not appear as effective as the medium sand treated at 0.5 M at adsorbing dye. While not wishing to be bound by any particular theory, the ineffectiveness is believed to have been due either to the different conditions of treatment (low I vs. high) or the lower surface area of the coarse sand relative to volume.

The results show that Orange OT dye will adsorb strongly onto treated CPG in the presence of SDS-Triton and is not removed by rinsing with DI water. In addition. treated CPG will adsorb Orange OT from an SDS-Triton-95% ethanol solution at low ionic strength, but untreated CPG will not. Furthermore, treated quartz sand adsorbs mixed micelles of SDS-Triton at low I and retains them after rinsing.

Accordingly, this example establishes that a polyelectrolyte-micelle solution can be introduced into a subsurface system, then driven to coacervation via ionic strength changes. Moreover, maximum adsorption of the model organic contaminant (i.e., Orange OT dye) occurred when the polyelectrolyte micelles were titrated to the point of coacervation in the presence of sand, followed by treatment with the model organic solution. By way of contrast, little of the model organic adsorbed onto the plain sand and little adsorbed when the coacervate had previously been formed absent sand.

EXAMPLE II

This Example illustrates that siliceous surfaces treated by polyelectrolye-micelle complexes can be widely applied as a permeable reactive barrier to trap organic pollutants. It is to be noted that, in this Example, Polydiallydimethylammonium chloride (PDADMAC) was a commercial sample ("Merquat 100") from Calgon (Pittsburgh, Pa.). Triton X-100 (TX100) was purchased from Aldrich, sodium dodecyl sulfate (SDS, purity>99%) from Fluka, Orange OT (1-(o-Tolylazo)-2-naphthol) from Aldrich, and NaCl from Fisher. All were used without further purification. Controlled pore glass (CPG, from Schott Gerate, Batch 91193/00) of 30–60 $\mu$m grain size with pores of 48.4 nm diameter was washed at room temperature for 1 to 2 hours in a 1% SDS, pH=9 NaOH solution as advised by the manufacturer. The CPG was then rinsed with DI water until no foaming was observed, and dried in an oven at 50° C. overnight. Quartz sand (99% quartz, 1% dark minerals) and washed sea sand (Fisher) were used without further treatment.

CPG was treated with polycation PDADMAC and negatively-charged TX100-SDS mixed micelles according to the procedures summarized in FIG. 10. For procedure I, samples of 0.3 g CPG were first gently agitated with 2 mL, 10 g/L PDADMAC at pH=8 and ionic strengths (I) of 500 mM or 1 mM for about 24 hrs. The samples were then centrifuged, rinsed with DI water, and oven dried at 50° C. overnight. The CPG-PDADMAC samples were then agitated with 4 mL, 40 mM TX100-SDS mixed micelles at SDS mole fraction=0.5 and I=500 mM or 1 mM for 30 mins. The SDS mole fraction is defined as Y=[SDS]/([SDS]+[TX100]), which is proportional to the average mixed-micelle surface charge density. For procedure II, CPG was treated with PDADMAC (2 mL, 10 g/L) together with TX100-SDS (4 mL, 40 mM, Y=0.5) at I=500 mM for 24 hrs. In this case, the macromolecular aqueous solution exhibits coacervation, which is a liquid-liquid phase separation: the more dense phase (coacervate) is relatively concentrated in macromolecules and is in equilibrium with the relatively dilute macromolecular liquid phase. In procedure III, CPG samples were treated with 4 mL, 40 mM TX100-SDS at I=500 mM or 1 mM for 24 hrs without any PDADMAC.

The treated CPG from procedures I, II and III are named CPG-PDADMAC/SDS-TX100, CPG/PDADMAC-SDS-TX100, and CPG/SDS-TX100, respectively. These treated CPGs were agitated with 3 mL Orange OT solution in ethanol (about 0.2 g/L) for 30 mins and equilibrated for 2 days. Then, the samples were washed with DI water for 30 mins. The resulting solids displayed different colors. Procedure I using CPG-PDADMAC/SDS-TX100 (I) at low ionic strength (1 mM) yielded the most dye retention, somewhat higher than at high ionic strength (500 mM). Procedure II with CPG/PDADMAC-SDS-TX100 (II) produced even less dye retention, while procedure III with CPG/SDS-TX100 (III) gave no dye retention regardless of ionic strength. The results indicated the superiority of PDADMAC and TX100-SDS two-step treatment, and showed that the polycation is necessary to anchor micelles to CPG.

Based on the above studies, polycation-micelle treated quartz- and sea-sands were prepared and evaluated using the same conditions as for CPG, as indicated in Table 4.

TABLE 4

Preparation and Evaluation of Polycation-Micelle Treated Sand

| Procedure | I | II | III | IV | V |
|---|---|---|---|---|---|
| Ionic Strength (mM) of PDADMAC treat | 500 | 1 | — | — | 500 |
| Ionic Strength (mM) of TX100-SDS treat | 500 | 1 | 500 | 1 | |
| Dye uptake, ranking | 2 | 1 | 3 | 3 | 2 |

It is to be noted that in the data reflected in Table 4, in the PDMAC treat, 3 g quartz- or sea-sands were agitated with 3.5 mL, 10 g/L PDADMAC for 24 hrs at ionic strength shown. In the TX100-SDS treat after rinsed with DI water and dried overnight at 50° C., sands were agitated with 4 mL, 40 mM TX100-SDS (Y=0.5) for 1 hr at ionic strength shown. For procedure V, sands were treated with 10 g/L PDADMAC and 40 mM TX100-SDS at I=500 mM and Y=0.5 in one step. With respect to the dye uptake ranking, treated sands were agitated with 3 mL concentrated Orange OT in ethanol for 30 mins and equilibrated for 12 hrs. Then, the samples were washed with 10 mL DI water for 30 mins and centrifuged. The orange colors on sands are different for different procedures. For III and IV, the sands are colorless.

The ranking of Orange OT uptake on treated sands was similar to that for CPG except that nearly identical dye uptake was observed for two-step and one-step protocols (procedures I and V, respectively). Procedure I with low ionic strength leads to better solubilization of Orange OT than high ionic strength (procedure II). Sand treated with mixed micelles only (procedures III and IV) cannot absorb Orange OT.

Although sand is more relevant to environmental substrates than glass, the absence of color on CPG makes it a more convenient substrate to study the dependence of ultimate solubilizing power on the ionic strength during the PDADMAC- and micelle-adsorption steps, respectively. Two-step treatment of CPG was carried out at different ionic strengths as shown in Table 5.

TABLE 5

Effects of Ionic Strength on Orange TO solubilization in PDADMAC and Micelle Adsorption Steps

| Procedure | I | II | III | IV |
|---|---|---|---|---|
| Ionic Strength (mM) of PDADMAC treat | 500 | 500 | 1 | 1 |
| Ionic Strength (mM) of TX100-SDS treat | 500 | 1 | 500 | 1 |
| Dye uptake, ranking | 2 | 1 | 2 | 1 |

It is to be noted that, in the data reflected in Table 5, in the PDADMAC treat, 0.3 g CPG were agitated with 2 mL, 10 g/L PDADMAC for 24 hrs at ionic strength shown. In the TX100-SDS treat, after rinsed with DI water and dried overnight at 50° C., PDADMAC-treated CPG were agitated with 4 mL, 40 mM TX100-SDS (Y=0.5) for 1hr at ionic strength shown. With respect to the dye uptake ranking, treated sands were agitated with 3 mL concentrated Orange OT in ethanol for 30 mins and equilibrated for 12 hrs. Then, the samples were washed with 20 mL DI water for 30 mins and centrifuged. The orange colors on CPG are different for different procedures.

After agitation with dye followed by DI water wash all samples were orange, but the final color intensities appeared to depend on the ionic strength used in micelle treatment (second) step: stronger for low ionic strength (1 mM) than high ionic strength (500 mM), regardless of the ionic strength used in the polycation treatment (step one). Adsorption conditions such as ionic strength and polymer concentration are known to control the adsorbed amount as well as the configuration of adsorbed polyelectrolytes (described in terms of trains, loops and tails), both of which should influence the subsequent retention of micelles. For highly charged polyelectrolyes such as PDADMAC, the adsorption amount normally decreases with a decrease in ionic strength. On the other hand, polyelectrol ytes adsorbed at low ionic strength adopt a loose structure of loops and tails due to electrostatic repulsion among adsorbed chains. The increased adsorption amount at higher ionic strength is likely to correspond to a denser adsorbed polymer layer in which micelles can only bind at the periphery. The result of these competing effects (more polymer adsorbed at higher ionic strength but in configurations less suitable for micelle binding) may be the apparently small effect of the ionic strength in step one. On the other hand, the strength of complex formation between polyelectrolyte and micelles increases with a decrease in ionic strength with the result that low ionic strength in the micelle treatment step leads to more surfactant adsorption and better solubilization.

To demonstrate the practical consequences of these findings, 12 g of medium sized quartz sand treated with PDADMAC (15 mL, 10 g/L) and TX100-SDS (15 mL, 40 mM, Y=0.5) by procedure II, as shown in Table 4, was sandwiched between two layers of untreated sand in a 50 mL burette. About 20 ml of ca. 1 g/L Orange OT dye solution in ethanol was poured into the burette. After the column was rinsed with 200 mL DI water, the dark orange color seen only in the middle layer of treated sand indicates that the treated quartz sand can remove and effectively retain the organic dye. It is interesting to note that calciferous sea sand (Clearwater beach) treated in the same manner would not retain dye. This result is almost certainly attributable to the absence of negative surface charge on calciferous sand which precludes polycation adsorption.

Accordingly, this Example illustrates that siliceous surfaces treated by polyelectrolye-micelle complexes have the potential to be widely applied as a permeable reactive barrier to trap organic pollutants. Polycations can be used to bind micelles to siliceous surfaces, and the bound micelles can then be used to solubilize and immobilize organic compounds. The adsorption of organic compound on these treated surfaces depends on the complexation between polycation and negatively-charged mixed micelles; since complexation can be reversed by added salt, the adsorbed organic compounds could be released from the solid by adjusting the ionic strength. This method for recovering the organophile without much dilution may be another key aspect for practical environmental control.

While this invention has been described with an emphasis upon preferred embodiments, it will be apparent to those of ordinary skill in the art that variations of the preferred embodiments may be used and that it is intended that the invention may be practiced otherwise than is specifically described herein. Accordingly, this invention includes all modifications encompassed within the spirit and scope of the invention as defined by the following claims.

What is claimed is:

1. A polymer-micelle complex comprising a negatively charged micelle, wherein said negatively charged micelle is electrostatically bound to a polymer bearing a positive charge.

2. The complex of claim 1, wherein said negatively charged micelle comprises at least one anionic surfactant and at least one nonionic surfactant.

3. The complex of claim 2, wherein the ratio of anionic surfactant to nonionic surfactant is from about 1:9 to about 9:1.

4. The complex of claim 3, wherein the ratio of anionic surfactant to nonionic surfactant is about 3:7 or lower.

5. The complex of claim 2, wherein the anionic surfactant is selected from the group consisting of alkyl aryl sulfonates, polyalkoxy carboxylates, N-Acylsarcosinates, acylated protein hydrolysates, short-chain alkylarenesulfonates, lignosulfonates, naphthalenesulfonates, α-olefinsulfonates, petroleum sulfonates, dialkyl sulfosuccinates, amidosulfonates, 2-sulfoethyl esters of fatty acids, fatty acid ester sulfonates, alcohol sulfates, ethoxylated alcohol sulfates, sulfated alkylphenol ethoxylates, sulfated acids, amides, and esters, sulfated natural oils and fats, phosphate esters, and combinations thereof.

6. The complex of claim 2, wherein the nonionic surfactant is selected from the group consisting of alcohol ethoxylates, alkylphenol ethoxylates, glycerol esters, polyoxycthylene esters, ethoxylated anhydrosorbitol esters, natural ethoxylated fats, oils, and waxes, glycol esters of fatty acids, alkyl polyglycosides, diethanolamine condensates, monoalkanolamine condensates, polyoxyethylene fatty acid amides, fatty acid glucamides, polyalkylene oxide block copolymers, poly(oxyethylene-co-oxypropylene, and combinations thereof.

7. The complex of claim 1, wherein the positively charged polymer has a molecular weight of at least about 100,000 daltons.

8. The complex of claim 1, wherein the positively charged polymer is selected from the group consisting of poly (diallyldimethylammonium chloride) (PDADMAC), poly (methacrylamidopropyltrimethyl ammonium chloride) (PMAPTAC), poly(L-Lysine), poly(L-Arginine), poly(4-vinylpyridinium salt), polethyleneimine (PEI), and combinations thereof.

9. The complex of claim 1, wherein said complex is electrostatically bound to a siliceous material.

10. The complex of claim 9, wherein said siliceous material is selected from the group consisting of sand, fiberglass, and combinations thereof.

11. The complex of claim 1, wherein said complex is soluble in an aqueous carrier.

12. The complex of claim 9, wherein said complex is in the form of a precipitate or coacervate.

13. A composition comprising the complex of claim 1 and an aqueous carrier.

14. The composition of claim 13, wherein the aqueous carrier is a saline solution.

15. The composition of claim 14, wherein said saline solution includes sodium chloride.

16. The composition of claim 14, wherein said saline solution has an ionic strength of from about 0.01 M to about 1.0 M.

17. The composition of claim 16, wherein said ionic strength is from about 0.01 M to about 0.3 M.

18. A filter comprising:
a filter element including a siliceous material and the complex of claim 1.

19. The filter of claim 18, wherein said siliceous material is selected from the group consisting of fiberglass, sand, and combinations thereof.

20. The filter of claim 18, wherein said filter element further comprises at least one binder.

21. The filter of claim 18, wherein said filter element further comprises at least one reinforcing material.

22. A method of treating a fluid comprising:
providing a medium comprising a siliceous material and the complex of claim 1; and
contacting said medium with said fluid.

23. The method of claim 22, wherein said fluid is an aqueous fluid including at least one organic contaminant.

24. The method of claim 22, wherein said siliceous material is selected from the group consisting of fiberglass, sand, and combinations thereof.

25. A method of trapping organic contaminants in a subsurface location including at least one siliceous material, said method comprising:
delivering the complex of claim 1 to said siliceous material at said subsurface location, wherein said complex electrostatically binds to said siliceous material so as to immobilize said complex on said siliceous material, and wherein said organic contaminants become trapped in the immobilized complex on said siliceous material.

26. The method of claim 25, wherein said delivering comprises pumping said complex through a pipe or tube having apertures therein.

27. The method of claim 25, further comprising extracting said organic contaminants from the earth.

28. A method of trapping organic contaminants in a subsurface location including at least one siliceous material, said method comprising:
delivering the composition of claim 14 to said siliceous material at said subsurface location, wherein said complex electrostatically binds to said siliceous material so as to immobilize said complex on said siliceous material, and wherein said organic contaminants become trapped in the immobilized complex on said siliceous material.

29. A method of inhibiting the seepage of an organic contaminant in a subsurface location, said method comprising:
contacting the complex of claim 1 with at least one siliceous material in said subsurface location so as to immobilize said complex on said siliceous material.

30. A composition comprising:
the complex of claim 1; and
a siliceous material, wherein said complex is electrostatically bound to said siliceous material.

31. A method of trapping an organic contaminant comprising:
contacting said organic contaminant with the composition of claim 30.

32. A composition comprising:
an aqueous carrier;
at least one negatively charged micelle;
at least one positively charged polymer; and
a siliceous material.

33. The composition of claim 32, wherein said aqueous carrier is a saline solution.

34. The composition of claim 33, wherein said negatively charged micelle electrostatically binds to said positively charged polymer to form a polymer-micelle complex.

35. The composition of claim 34, wherein said complex is soluble in said aqueous carrier.

36. The composition of claim 34, wherein said complex is in the form of a precipitate or coacervate.

37. The composition of claim 32, wherein said siliceous material is selected from the group consisting of sand, fiberglass, and combinations thereof.

38. A method of trapping organic contaminants in a subsurface location of the earth where said organic contaminants and at least one siliceous material are present, said method comprising:
delivering the composition of claim 32 to said subsurface location; and
permitting formation of a polymer-micelle complex in said composition, wherein said complex electrostatically binds to said siliceous material to form a bound complex, and wherein said bound complex traps said organic contaminants therein.

39. The method of claim 38, further comprising:
delivering a saline solution to said location after organic contaminants are trapped in said complex, wherein said delivery of said saline solution serves to separate said polymer and said micelle so as to break said complex; and
extracting at least a portion of said saline solution, said polymer, said micelle, and said organic contaminants from the earth.

40. A method of trapping organic contaminants in a subsurface location of the earth where said organic contaminants and at least one siliceous material are present, said method comprising:
delivering a composition comprising (i) an aqueous carrier, (ii) at least one negatively charged micelle, and (iii) at least one positively charged polymer, to said subsurface location; and
permitting formation of a polymer-micelle complex in said composition, wherein said complex electrostatically binds to said siliceous material to form a bound complex, and wherein said bound complex traps said organic contaminants therein.

41. The method of claim 40, further comprising:
delivering a saline solution to said location after organic contaminants are trapped in said complex, wherein said delivery of said saline solution serves to separate said polymer and said micelle so as to break said complex; and
extracting at least a portion of said saline solution, said polymer, said micelle, and said organic contaminants from the earth.

* * * * *

UNITED STATES PATENT AND TRADEMARK OFFICE
CERTIFICATE OF CORRECTION

PATENT NO.   : 6,524,485 B1  
DATED        : February 25, 2003  
INVENTOR(S)  : Dubin et al.

It is certified that error appears in the above-identified patent and that said Letters Patent is hereby corrected as shown below:

Column 16,
Line 63, "claim 9" should read -- claim 1 --.

Signed and Sealed this

Twelfth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,524,485 B1
DATED         : February 25, 2003
INVENTOR(S)   : Dubin et al.

It is certified that error appears in the above-identified patent and that said Letters Patent is hereby corrected as shown below:

<u>Title page,</u>
Item [56], References Cited, please insert the following:

-- U.S. PATENT DOCUMENTS

| | | |
|---|---|---|
| 5,908,619 | 06/1999 | Scholz |
| 6,210,717 | 04/2001 | Choi et al. |
| 6,248,317 | 06/2001 | Snyder et al. |
| 6,284,230 | 09/2001 | Sako et al. -- |

Signed and Sealed this

Second Day of December, 2003

JAMES E. ROGAN
*Director of the United States Patent and Trademark Office*